Patented July 25, 1950

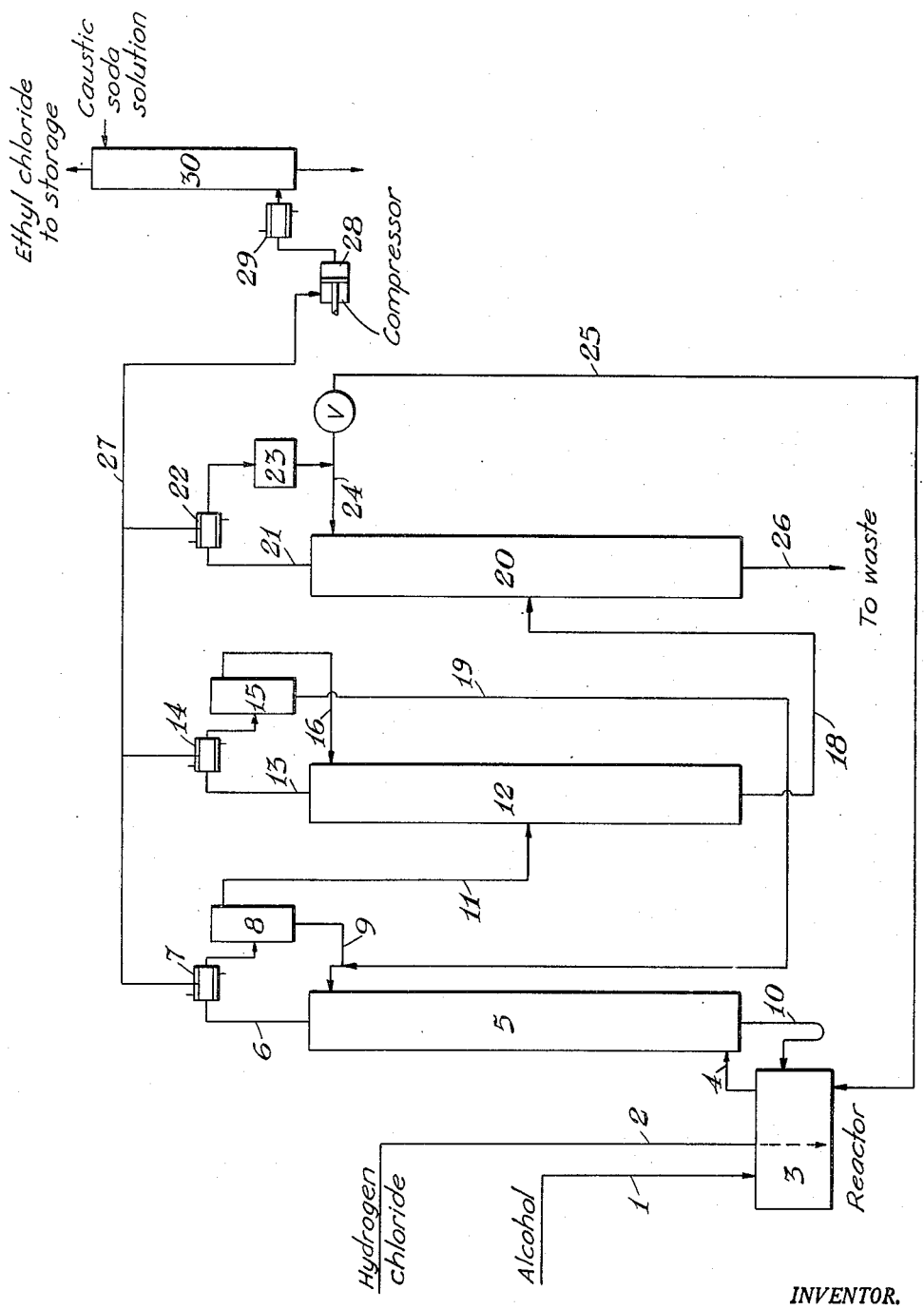
INVENTOR.
John Lloyd McCurdy
BY
Griswold & Burdick
ATTORNEYS

2,516,638

UNITED STATES PATENT OFFICE 2,516,638

CONTINUOUS PROCESS FOR THE MANUFACTURE OF ETHYL CHLORIDE

John Lloyd McCurdy, Midland, Mich., assignor to The Dow Chemical Company, Midland, Mich., a corporation of Delaware Application March 3, 1947, Serial No. 731,945

8 Claims. (Cl. 260—657)

This invention relates to a continuous method for the manufacture of ethyl chloride from ethyl alcohol. It relates in particular to such a method wherein the reaction takes place in the liquid phase.

Numerous processes are known for the preparation of ethyl chloride. These may generally be divided into three groups, namely: (1) processes of hydrochlorinating ethylene; (2) processes involving reaction between hydrogen chloride and ethyl ether; and (3) processes involving the reaction between hydrogen chloride and ethyl alcohol (a) in vapor phase over suitable catalysts or (b) in liquid phase, usually in the presence of water-acceptors such as zinc chloride, sulfuric acid, calcium chloride or the like. It is to the latter subdivision of the last named type of process that the present invention relates.

It has been the prior experience, in the preparation of ethyl chloride from ethyl alcohol, in the liquid phase, that water formed as a by-product in the reaction tends to accumulate in the reactor, and soon dilutes the reagents and catalyst to an extent which prevents further catalysis, and the reaction gradually slows and stops, and the reactor gradually fills with liquid. Such process has necessarily been operated batchwise. When attempts have been made to distill the water from the reaction vessel along with the produced ethyl chloride, it has necessarily been accompanied by much of the alcohol present. The distilled dilute alcohol has either had to be discarded, making the process very costly, or it has been returned to the reactor with much of the accompanying water, so that little advantage is gained by the distillation. In all such processes, as the water content of the reactor is gradually increased, the boiling point of the reaction mixture is also increased, and the reaction temperature must be changed correspondingly in attempts to overcome the retarding effects of the water, or the reaction will soon come to a stop. None of the prior methods of carrying out this process has provided a continuous method, and none of them has provided a means for keeping constant the rate and temperature of reaction.

It is among the objects of the present invention to provide a process for the continuous preparation of ethyl chloride from ethyl alcohol, in the liquid phase. It is a further object to provide such a process in which the rate and temperature of reaction may be kept constant. A particular object is to provide such a process whereby ethyl chloride may be produced economically in high yield relative to the quantities of alcohol introduced into the reaction vessel. A specific object is to provide such a method wherein the concentration of water in the reaction vessel is not materially increased and that of alcohol is not materially diminished as the reaction proceeds. Other and related objects may appear as the description of the invention proceeds.

It has now been found that ethyl chloride may be produced in a continuous manner, by reaction of ethyl alcohol with hydrogen chloride, with the alcohol in the liquid phase, in the presence of an aqueous solution of a metal chloride catalyst such as calcium chloride, and of a volatile material which will form with water and alcohol a ternary azeotrope of the type which separates into two layers when condensed, so that by decantation and rectification the water produced during the reaction may be eliminated and the unreacted alcohol may be recovered and returned to the reaction chamber. Among the suitable azeotrope-forming agents for the present reaction system are carbon tetrachloride and trichloroethylene. Others will be named hereinafter.

The invention will be more readily understood when described with reference to the accompanying drawing, the single figure of which is a diagrammatic representation of an apparatus for carrying out the new continuous method.

Referring now to the drawing, the process of the invention is carried out by supplying liquid ethyl alcohol through line 1 and anhydrous hydrogen chloride gas through line 2 to a reaction vessel 3 containing an aqueous solution of calcium chloride and a layer of carbon tetrachloride or other azeotroping agent for the water and alcohol. Reactor 3 is heated, suitably by internal steam coils, to initiate the exothermic reaction between the alcohol and hydrogen chloride and to effect distillation of the terinary water-alcohol-carbon tetrachloride azeotrope. This azeotrope, which boils at about 62° C. (the reaction temperature is maintained slightly above that point) passes up through line 4 to column 5, any entrapped higher boiling material, such as excess water or carbon tetrachloride over that in the true azeotrope being returned to reactor 3 through line 10. The azeotropic distillate from column 5 consists of 3.4 per cent by weight of water, 10.3 per cent of alcohol and 86.3 per cent of carbon tetrachloride, and passes through overhead line 6 and condenser 7, from which the condensed liquids are passed to separator 8 where they divide into two layers. The bottom layer, consisting of 1.0 per cent by weight of water, 2.5 per cent of alcohol and 96.5 per cent of carbon tetrachloride, is returned continuously through line 9 to column 5, and supplies the carbon tetrachloride for the formation of additional azeotrope. The top layer from separator 8 consists of 38 per cent by weight of alcohol, 9.5 per cent of water and 52.5 per cent of carbon tetrachloride, and is fed through line 11 to column 12. The overhead distillate from this column is again the 3.4–10.3–86.3 azeotrope of water-alcohol-carbon tetrachloride, and is passed through line 13 and condenser 14 to separator 15 where two layers are formed as in separator 8. The top layer is returned as reflux through line 16 to column 12, and the bottom layer, chiefly carbon tetrachloride, is returned through line 19 to column 5 to be available for the formation of additional azeotrope in column 5 or reactor 3, to which it may return through line 10.

The bottoms from column 12, consisting of alcohol and water, pass through line 18 to column 20 from which a concentrated alcohol is distilled overhead through line 21, condenser 22 and reflux accumulator 23, and is then returned in part through line 25 to reactor 3 as feed for the principal reaction. Some of the alcohol is used as reflux in column 20. The bottoms from column 20 consist chiefly of water, and pass through line 26 to the sewer.

Ethyl chloride vapor passes from reactor 3 through the system with the azeotrope and the undissolved portion is drawn off as vapor from each of condensers 7, 14 and 22, which are at a temperature above the boiling point of ethyl chloride, through line 27 to compressor 28 and condenser 29. The ethyl chloride, containing some dissolved hydrogen chloride, is scrubbed with aqueous sodium hydroxide solution in scrubber 30, and passes to storage in a substantially pure condition.

In a specific example, employing the apparatus just described, the analyses at each point in the system were found to be those reported above, after stable conditions had been attained in the complete system. The reaction vessel 3 initially contained 400 parts of water, by weight, 215 parts of calcium chloride, and 278 parts of carbon tetrachloride. There was added 192 parts by weight of ethyl alcohol (calculated as 100 per cent) and its accompanying 10 parts of water. The reactor was heated to about 70° C., slightly above the boiling point of the water-alcohol-carbon tetrachloride azeotrope (62° C.), and dry hydrogen chloride gas was introduced under the surface of the boiling liquids. Thereafter the rates of introduction of ethyl alcohol and of hydrogen chloride were kept constant, at a ratio of about 1.2 mols of hydrogen chloride for each mol of ethanol. In the early stages of the reaction, and until the system reached equilibrium, additional carbon tetrachloride was introduced to maintain the azeotropic distillation from the reaction vessel. After 14 hours of operation, the reaction vessel 3 and the various columns 5, 12 and 20 were cooled, and their contents were removed and analyzed to obtain a material balance. The results are tabulated below:

| Material | Parts by Weight | |
|---|---|---|
| | Total Charge | Total Recovered or Accounted For |
| Ethyl alcohol (calc. 100%) | 498.4 | 488.2 (334.4 recovered) |
| Carbon tetrachloride | 674.3 | 626.4 |
| Hydrogen chloride | 475.0 | 424.0 |
| Water, as H$_2$O and in alcohol | 426.0 | 480.1 |
| Water produced in reaction | 60.3 | |
| Calcium choloride | 215.0 | 210.5 |
| Ethyl chloride | | 216.3 |

On the basis of 164 parts by weight (3.565 mols) of alcohol which was not recovered as such, the yield of 216.3 parts (3.353 mols) of ethyl chloride is 94.1 per cent of the theoretical.

Other and longer runs were made, and when the rate of introduction of ethyl alcohol was reduced somewhat, and the ratio of hydrogen chloride to alcohol was dropped to about equimolar proportions, and the heat input was kept just sufficient to maintain distillation from the reaction vessel, the losses of hydrogen chloride and of carbon tetrachloride were reduced and the general efficiency of the system was increased. Ethyl chloride yields in the general order of 92 to 97 per cent were obtained.

To compare the effectiveness of various metal chloride catalysts, when used in the present process, a series of runs was made in which all operating conditions were kept as nearly constant as possible, and the rate of production of ethyl chloride was determined over a period of several hours. Following are the data obtained:

| Catalyst | Ethyl Chloride Production, Parts Per Hour |
|---|---|
| Calcium chloride | 9.8 |
| Ferric chloride | 1.84 |
| Aluminum chloride | 4.5 |
| Half ferric chloride—half calcium chloride | 3.2 |

It is apparent that, while each of the materials tested may be used in the process, the greatest catalytic efficiency is obtained with calcium chloride.

Other runs were made using aqueous hydrochloric acid instead of gaseous hydrogen chloride. This placed a greater burden on the system because of the considerably larger volumes of water which had to be removed in order to keep the reaction vessel from filling up and because of the loss to the system of the heat of solution of hydrogen chloride in water, which helps to maintain distillation when gaseous hydrogen chloride is used. Thus, gaseous hydrogen chloride reacts with liquid ethanol to form ethyl chloride and steam, with the liberation of 41,600 B. t. u. per pound mol, but aqueous hydrochloric acid liberates only 10,160 B. t. u. per pound mol in the same reaction. Except for the reduction in effective capacity of the equipment and the requirement for a greater heat input when using aqueous hydrochloric acid, the process is fully as operative as when using gaseous hydrogen chloride, provided the acid concentration is kept above 10 and preferably above 15 per cent. When hydrochloric acid of less than 10 per cent concentration is used, there is no appreciable formation of ethyl chloride. Similarly, when using gaseous hydrogen chloride, there is apparently no ethyl chloride produced until the concentration of hydrogen chloride relative to the water in the reaction vessel exceeds about 10 per cent.

The invention has been illustrated with respect to the use of carbon tetrachloride as the azeotrope forming material. Other agents which form azeotropic mixtures with ethanol and water, and which may be used in the herein described process instead of the carbon tetrachloride, include benzene, cyclohexane, ethylene chloride, and trichloroethylene. In each case the azeotrope boils at a temperature at which ethanol and hydrogen chloride react readily. These agents differ slightly as to the amount of water and of alcohol which they carry with them in the ternary azeotrope. Under ideal circumstances, i. e. with no ethyl chloride or hydrogen chloride present, the analysis of these ternary azeotropes is approximately as follows:

| | Percent | Percent Water | Percent Ethanol | B. P., °C. |
|---|---|---|---|---|
| Benzene | 74.1 | 7.4 | 18.5 | 64.9 |
| Cyclohexane | 73.0 | 7.0 | 20.0 | 62.0 |
| Ethylene chloride | 78.0 | 5.0 | 17.0 | 66.7 |
| Trichloroethylene | 69.0 | 5.0 | 26.0 | 67.3 |
| Carbon tetrachloride | 86.3 | 3.4 | 10.3 | 62.0 |

In comparison with carbon tetrachloride, each of the other azeotrope-forming materials removes more water from the reaction zone but also requires a greater inventory of unreacted alcohol in the system. The chlorinated hydrocarbons are preferred, since they are not affected by any chlorine which may be formed by oxidation of the hydrogen chloride.

The present process may be applied not only to the preparation of ethyl chloride but also to the preparation of n-propyl chloride or of iso-propyl chloride from the corresponding alcohols. The same azeotrope-forming agents as are disclosed above form azeotropes with mixtures of water and each of the propyl alcohols. In such case, the initial azeotropic distillate from reactor 3 may be run through a stripping column to remove the alkyl chloride before the azeotrope is fed to column 5 for recovery of the alcohol and the azeotrope-forming liquid. Since, however, it is feasible to separate the propyl and higher chloride-alcohol mixtures from water by decantation, the present process is not required for the preparation of alkyl chlorides higher than ethyl chloride.

Of the various alkyl chlorides commonly produced from a corresponding alcohol, ethyl chloride is the most important commercially, and the process finds its most practical application in the preparation of ethyl chloride.

I claim:

1. A process for the preparation of ethyl chloride from ethyl alcohol in the liquid phase, which comprises mixing liquid ethyl alcohol with hydrochloric acid of at least 10 per cent concentration in the presence of an aqueous solution of a metal chloride catalyst for such reaction and in the presence of a volatile agent selected from the group consisting of benzene, cyclohexane, ethylene chloride, trichloroethylene, and carbon tetrachloride, heating the mixture to a temperature at which a ternary azeotrope distills therefrom which is separable into two immiscible layers when condensed, continuously supplying alcohol and hydrochloric acid to the reaction mixture, continuously separating and recovering ethyl chloride from the distillate, continuously separating the azeotrope into its component parts by decantation and rectification, and returning the unchanged alcohol and azeotrope-forming liquid to the reaction zone.

2. A process as claimed in claim 1, wherein the azeotrope-forming liquid is carbon tetrachloride.

3. A process as claimed in claim 1, wherein the azeotrope-forming liquid is trichloroethylene.

4. A process for the preparation of ethyl chloride from ethyl alcohol in the liquid phase, which comprises mixing liquid ethyl alcohol with hydrochloric acid of at least 10 per cent concentration in the presence of an aqueous solution of calcium chloride and in the presence of carbon tetrachloride, heating the mixture to a temperature of at least 62° C. at which an azeotrope of water, alcohol and carbon tetrachloride distills therefrom, continuously supplying alcohol and hydrochloric acid to the reaction mixture, continuously separating ethyl chloride from the distillate, continuously separating the azeotrope into its component parts by decantation and rectification, and returning the unchanged alcohol and carbon tetrachloride to the reaction zone.

5. A process for the preparation of ethyl chloride from ethyl alcohol in the liquid phase, which comprises mixing liquid ethyl alcohol with hydrochloric acid of at least 10 per cent concentration in the presence of an aqueous solution of calcium chloride and in the presence of carbon tetrachloride, heating the mixture to a temperature of at least 62° C. at which an azeotrope of water, alcohol and carbon tetrachloride distills therefrom, continuously supplying liquid alcohol and hydrogen chloride gas to the reaction mixture, continuously separating the azeotrope into its component parts by decantation and rectification, and returning the unchanged alcohol and carbon tetrachloride to the reaction zone.

6. A process for the preparation of ethyl chloride from ethyl alcohol in the liquid phase, which comprises continuously mixing liquid ethyl alcohol with hydrochloric acid of at least 10 per cent concentration in the presence of an aqueous solution of a metal chloride catalyst for such reaction and in the presence of a volatile agent selected from the group consisting of benzene, cyclohexane, ethylene chloride, trichlorethylene, and carbon tetrachloride, continuously heating the mixture to a temperature at which a ternary azeotrope distills therefrom which is separable into two immiscible layers when condensed, continuously condensing the so-distilled azeotrope, continuously separating the layers thereof, continuously returning the layer containing most of the azeotroping agent as reflux in said distillation continuously subjecting the predominantly aqueous alcoholic layer to redistillation, continuously condensing and separating the layers of the redistilled product, continuously returning the layer containing the azeotroping agent to the reaction zone and using the predominantly aqueous-alcoholic layer as reflux in the redistillation, continuously drawing off as bottoms from said redistillation a mixture of water and alcohol, continuously rectifying the last said mixture to recover alcohol therefrom and returning said alcohol continuously to the reaction zone, while recovering ethyl chloride from the overhead in each said distillation and rectification, and continuously introducing hydrogen chloride gas into the reaction zone to maintain therein a hydrochloric acid concentration of at least 10 per cent.

7. A process for the preparation of ethyl chloride from ethyl alcohol in the liquid phase, which comprises continuously mixing liquid ethyl alcohol with hydrochloric acid of at least 10 per cent concentration in the presence of an aqueous solution of a metal chloride catalyst for such reaction and in the presence of carbon tetrachloride, continuously heating the mixture to a temperature of 62° C. to distill an azeotrope of water, alcohol and carbon tetrachloride therefrom, continuously condensing said azeotrope, continuously separating the layers thereof, continuously returning the lower layer containing most of the carbon tetrachloride as reflux in said distillation, continuously distilling the separated upper layer, continuously condensing and separating the layers of the latter distillate, continuously returning the lower layer of the latter distillate to the reaction zone and using the separated upper layer of said distillate as reflux in the second said distillation, continuously drawing off as bottoms from the second distillation zone a mixture of water and alcohol, continuously rectifying the last said mixture to recover alcohol therefrom and returning said alcohol continuously to the reaction zone, while recovering ethyl chloride from the overhead in each said distillation and rectification, and continuously introducing hydrogen chloride gas into the reaction zone to maintain therein a hydrochloric acid concentration of at least 10 per cent.

8. A process for the preparation of ethyl chloride from ethyl alcohol in the liquit phase, which comprises continuously mixing liquid ethyl alcohol with hydrochloric acid of at least 10 per cent concentration in the presence of an aqueous solution of a metal chloride catalyst for such reaction and in the presence of trichlorethylene, continuously heating the mixture to a temperature of about 67.3° C. to distill an azeotrope of water, alcohol and trichlorethylene therefrom, continuously condensing said azeotrope, continuously separating the layers thereof, continuously returning the lower layer containing most of the trichlorethylene as reflux in said distillation, continuously distilling the separated upper layer, continuously condensing and separating the layers of the latter distillate, continuously returning the lower layer of the latter distillate to the reaction zone and using the separated upper layer of said distillate as reflux in the second said distillation, continuously drawing off as bottoms from the second distillation zone a mixture of water and alcohol, continuously rectifying the last said mixture to recover alcohol therefrom and returning said alcohol continuously to the reaction zone, while recovering ethyl chloride from the overhead in each said distillation and rectification, and continuously introducing hydrogen chloride gas into the reaction zone to maintain therein a hydrochloric acid concentration of at least 10 per cent.

JOHN LLOYD McCURDY.

REFERENCES CITED

The following references are of record in the file of this patent:

UNITED STATES PATENTS

| Number | Name | Date |
|---|---|---|
| 1,852,063 | Ricard | Apr. 5, 1932 |
| 2,026,131 | Klein | Dec. 31, 1935 |
| 2,153,170 | Buc et al. | Apr. 4, 1939 |
| 2,308,170 | Green et al. | Jan. 12, 1943 |
| 2,385,546 | Smith | Sept. 25, 1945 |